United States Patent
Peker et al.

(10) Patent No.: US 8,193,737 B2
(45) Date of Patent: Jun. 5, 2012

(54) COLOR MANAGER FOR BACKLIGHT SYSTEMS OPERATIVE AT MULTIPLE CURRENT LEVELS

(75) Inventors: Arkadiy Peker, New Hyde Park, NY (US); Alon Ferentz, Bat Yam (IL); Tamir Langer, Givataim (IL)

(73) Assignee: Microsemi Corp. -Analog Mixed Signal Group Ltd., Hod Hasharon (IL)

( * ) Notice: Subject to any disclaimer, the term of this patent is extended or adjusted under 35 U.S.C. 154(b) by 422 days.

(21) Appl. No.: 12/480,185

(22) Filed: Jun. 8, 2009

(65) Prior Publication Data
US 2009/0302781 A1  Dec. 10, 2009

Related U.S. Application Data

(60) Provisional application No. 61/060,145, filed on Jun. 10, 2008.

(51) Int. Cl.
*H05B 37/02* (2006.01)
(52) U.S. Cl. .................. 315/307; 315/155; 315/297
(58) Field of Classification Search .................. 315/224, 315/247, 291–311
See application file for complete search history.

(56) References Cited

U.S. PATENT DOCUMENTS

| | | | |
|---|---|---|---|
| 4,064,530 A | 12/1977 | Kaiser et al. | |
| 4,695,885 A | 9/1987 | Kim | |
| 5,387,921 A | 2/1995 | Zhang et al. | |
| 5,717,978 A | 2/1998 | Mestha | |
| 6,127,783 A | 10/2000 | Pashley et al. | |
| 6,194,839 B1 | 2/2001 | Chang | |
| 6,201,353 B1 | 3/2001 | Chang et al. | |
| 6,373,964 B1 | 4/2002 | Geissler et al. | |
| 6,411,046 B1 | 6/2002 | Muthu | |
| 6,441,558 B1 | 8/2002 | Muthu | |
| 6,521,879 B1 | 2/2003 | Rand et al. | |
| 6,576,881 B2 | 6/2003 | Muthu | |

(Continued)

FOREIGN PATENT DOCUMENTS
WO  2004084170 A1  9/2004
(Continued)

OTHER PUBLICATIONS

International Search Report and Written Opinion for PCT/IL2009/000565, European Patent Office, Nov. 12, 2009.

(Continued)

*Primary Examiner* — Shawki S Ismail
*Assistant Examiner* — Jany Tran
(74) *Attorney, Agent, or Firm* — Simon Kahn

(57) ABSTRACT

A color manager for use with a luminaire constituted of a plurality of different colored light emitting diode based sub-luminaires arranged to produce a combined light. The color manager is constituted of a sampler arranged to output an electrical representation of the optical output of the luminaire, a converter coupled to the output of said sampler and operatively associated with a current selector arranged to select the driving current level of the luminaire from a plurality of current levels. The converter is arranged to convert said electrical representation to a pre-determined calorimetric system in cooperation with a calibration matrix whose values are selected responsive to the selected driving current level. The color manager further comprises a driver operatively associated with the luminaire, the converter and current selector and arranged to drive the luminaire in accordance with the driving current level as selected by the selector.

29 Claims, 8 Drawing Sheets

U.S. PATENT DOCUMENTS

| | | |
|---|---|---|
| 6,611,249 B1 | 8/2003 | Evanicky et al. |
| 6,624,847 B1 | 9/2003 | Abdellatif |
| 6,870,525 B2 | 3/2005 | Kawabata et al. |
| 6,894,442 B1 | 5/2005 | Lim et al. |
| 6,930,737 B2 | 8/2005 | Weindorf et al. |
| 7,001,059 B2 | 2/2006 | Han et al. |
| 7,176,438 B2 | 2/2007 | Bamji et al. |
| 7,255,462 B2 | 8/2007 | Tseng |
| 7,315,288 B2 | 1/2008 | Livingston et al. |
| 7,348,949 B2 | 3/2008 | Lee et al. |
| 2001/0035853 A1 | 11/2001 | Hoelen et al. |
| 2002/0179816 A1 | 12/2002 | Haines et al. |
| 2004/0135522 A1 | 7/2004 | Berman et al. |
| 2005/0212459 A1 | 9/2005 | Patel et al. |
| 2005/0231127 A1 | 10/2005 | Yamamoto et al. |
| 2005/0231459 A1 | 10/2005 | Furukawa |
| 2006/0038769 A1 | 2/2006 | Marra et al. |
| 2006/0050529 A1 | 3/2006 | Chou et al. |
| 2006/0108933 A1 | 5/2006 | Chen |
| 2006/0132423 A1 | 6/2006 | Travis |
| 2006/0187181 A1 | 8/2006 | Kim |
| 2006/0221047 A1 | 10/2006 | Tanizoe et al. |
| 2006/0244508 A1 | 11/2006 | Zheng et al. |
| 2007/0046485 A1 | 3/2007 | Grootes et al. |
| 2007/0063961 A1 | 3/2007 | Kuroki |
| 2007/0115228 A1* | 5/2007 | Roberts et al. ............. 345/82 |
| 2007/0146266 A1 | 6/2007 | Yasuda et al. |
| 2007/0182701 A1 | 8/2007 | Kim et al. |
| 2008/0018267 A1 | 1/2008 | Arakawa et al. |
| 2008/0238341 A1* | 10/2008 | Korcharz et al. ............ 315/297 |
| 2009/0127431 A1* | 5/2009 | Helbing et al. .............. 250/205 |

FOREIGN PATENT DOCUMENTS

| | | |
|---|---|---|
| WO | 2005048659 A2 | 5/2005 |
| WO | 2005111976 A1 | 11/2005 |
| WO | 2006005033 A2 | 1/2006 |
| WO | 2006070323 A1 | 7/2006 |
| WO | 2006129260 A2 | 12/2006 |
| WO | 2007049180 A1 | 5/2007 |
| WO | 2008056321 A1 | 5/2008 |

OTHER PUBLICATIONS

Perduijn et al; "Light Output Feedback Solution for RGB LED Backlight Application"; SID 00 Digest; 2000; pp. 1-3; The Society for Information Display, San Jose, California.

Perduijn et al; "Light Output Feedback Solution for RGB LED Backlight Application"; SID 03 Digest; 2003; pp. 1254-1256; The Society for Information Display, San Jose, California.

Chen et al; "LED Back-Light Driving System for LCD Panels"; Applied Power Electronics Conference and Exposition; Published Mar. 19-23, 2006; IEEE New York.

Li, Perry Y. and Dianat, Sohail A.; "Robust Stabilization of Tone Reproduction Curves for the Xerographic Printing Process"; IEEE Transaction on Control Systems Technology, vol. 9, No. 2, Mar. 2001; pp. 407-415; published IEEE, New York.

Li, Perry Y. and Dianat, Sohail A., "Robust Stabilization of Tone Reproduction Curves for the Xerographic Printing Process"; 1998 IEEE Conference on Control Applications; Sept., Trieste, 1998; published IEEE, New York.

Gu, Y., N. Narendran, T. Dong and H. Wu; Spectral and Luminous Efficiency Change of High Power LEDs Under Different Dimming Methods; Sixth International Conference on Solid State Lighting, Proceedings of SPIE; 2006; published by Society of Photo-Optical Instrument Engineers, Bellingham, WA.

* cited by examiner ately results in changes to the spectral output of constituent LEDs of luminaire 120, since the spectral output of the constituent LEDs is sensitive to the driving current level. Furthermore, there is a tendency of colored LEDs to change their output as a function of temperature, age and other environmental conditions. One method of overcoming this difficulty is by exclusively using PWM at a fixed current value. Backlighting system 10 advantageously controls the color point responsive to a calibration matrix established at a predetermined driving point. The use of AM modulation in backlighting system 10 results in an improper color point, since calibration matrix 150 is defined at a predetermined current value.

COLOR MANAGER FOR BACKLIGHT SYSTEMS OPERATIVE AT MULTIPLE CURRENT LEVELS

CROSS-REFERENCE TO RELATED APPLICATIONS

This application claims priority to U.S. Provisional Patent Application Ser. No. 61/060,145 filed Jun. 10, 2008, entitled "Color Manager for Backlight Systems Operative at Multiple Current Levels", the entire contents of which is incorporated herein by reference.

TECHNICAL FIELD

The present invention relates to backlight systems, and more particularly to controlling the combined color output of colored light emitting diode based backlight systems.

BACKGROUND OF THE INVENTION

Light emitting diodes (LEDs) are widely used in lighting and backlighting systems. Specifically, LEDs with an overall high luminance are useful in a number of applications including backlighting for liquid crystal display (LCD) based monitors and televisions. In a large LCD backlight system, LEDs are supplied in one or more strings of serially connected LEDs, thus sharing a common current.

Supplying a white backlight with colored LEDs is achieved by placing one or more individual strings of colored LEDs in proximity so that in combination their light is seen as white light. The white point of the light is an important factor to control, and much effort in design is centered on the need to maintain a correct white point.

FIG. 1 shows a high level schematic block diagram of a backlighting system 10, (not in the drawing) according to the prior art, comprising a color manager 100, a sampler 110 and a luminaire 120. Color manager 100 comprises: a current driver 130; a converter 140 comprising a calibration matrix 150; and a difference module 160. Current driver 130 is coupled to luminaire 120. Luminaire 120 comprises strings of colored LEDs in proximity such that the red, green and blue LEDs are combined to produce a white light or any other predetermined color. Luminaire 120 is in optical communication with sampler 110, typically constituted of a digitizer in communication with an RGB photodiode assembly. The RGB photodiode assembly may be integrated within sampler 110, or provided as a separate sensor in communication with sampler 110. Sampler 110 outputs a tristimulus output, wherein each signal represents the intensity of a sampled color, denoted as RS, GS and BS, which is coupled to converter 140.

Converter 140 outputs a tristimulus output, wherein each signal represents a value in a predetermined color space, denoted XS, YS and ZS. The tristimulus output of converter 140 is coupled to the input of difference module 160. Difference module 160 further receives external signals, denoted XT, YT and ZT, corresponding to the desired output color point and intensity of luminaire 120, and outputs signals responsive to the difference between signals XS, YS, ZS and XT, YT, ZT, respectively, denoted ERROR1, ERROR2 and ERROR3. The external signals XT, YT and ZT may be generated by a video processor or controller (not shown) that is coupled to color manager 100.

Converter 140 is operative to convert the sampled light output of sampler 110 in cooperation with calibration matrix 150. Calibration matrix 150 is typically determined by a single pass of calibration values during manufacture, in which each of the colored LED strings of luminaire 120 are lit independently at a predetermined duty cycle, the output of sampler 110 is read, and the output of luminaire 120 is measured by a calorimeter arranged to express the measured output values in a desired calorimetric system. There is no requirement that CIE values be used, and any consistent calorimetric system may be utilized. The values measured by the calorimeter are compared with the output of sampler 110 and calibration matrix 150 is developed responsive thereto.

Since RS, GS, BS and XT, YT, ZT are not defined over the same color space, color manager 100 is arranged to convert sampled color intensity values RS, GS and BS into a calorimetric system consonant with calorimetric system of the target color point using converter 140. This is accomplished in cooperation with calibration matrix 150, which is defined at a particular operating point of luminaire 120, typically during the calibration process.

Color manager 100 is thus arranged to maintain at any given time the color point of operation of luminaire 120 responsive to the received external signals. Maintaining a predetermined color point is achieved by: sampling the combined output of the colored LED strings using sampler 110; converting the sampled output to a calorimetric system consonant with the received external signals using converter 140; comparing the converted sampled output with the received external signals using difference module 160; and correcting the output color point of luminaire 120, if required, by controlling the driving current of current driver 130.

As mentioned above, color manager 100 is fed with externally supplied signals XT, YT and ZT which define the target color point output of luminaire 120, and typically further define the intensity. It is to be understood that a backlight may be comprised of a plurality of zones, each comprising therein a luminaire 120 and sampler 110, with an associated color manager 100. A single color manager 100 may be associated with a plurality of zones.

The intensity of the colored LED strings constituting luminaire 120 may be controlled by amplitude modulation (AM) of the driving current and/or by pulse width modulation (PWM). Specifically, in AM the value of the constant current driving the LEDs is adjusted, while in PWM, the duty cycle is controlled to dim or brighten the LEDs of the LED string by adjusting the average current over time. Thus, color manager 100 may adjust either AM or the PWM of each colored LED string of luminaire 120 responsive to ERROR1, ERROR2 and ERROR3, consequently maintaining the desired color point.

Additionally, a user or controlled dimming input may be received. Dimming may be accomplished by further modifying the AM or PWM of each colored LED string of luminaire 120 without modifying the desired color point.

The use of AM unfortunately results in changes to the spectral output of constituent LEDs of luminaire 120, since the spectral output of the constituent LEDs is sensitive to the driving current level. Furthermore, there is a tendency of colored LEDs to change their output as a function of temperature, age and other environmental conditions. One method of overcoming this difficulty is by exclusively using PWM at a fixed current value. Backlighting system 10 advantageously controls the color point responsive to a calibration matrix established at a predetermined driving point. The use of AM modulation in backlighting system 10 results in an improper color point, since calibration matrix 150 is defined at a predetermined current value.

LCD based monitors and televisions are placed in various settings, in which ambient light may change. Dimming of the backlight responsive to the ambient light setting is known to the prior art. However the exclusive use of PWM dimming, as described above, limits the range of brightness settings available to the user in cooperation with ambient light based dimming, since very low PWM settings may result in flicker, and maximum brightness achieved at high PWM settings is typically less than that available by increasing the instantaneous current.

Certain LCD based monitors exhibit a scanning backlight mode, in addition to a non-scanning backlight mode. In the scanning backlight mode the backlight is turned on and off at fixed intervals, resulting in a reduced overall luminance. It would thus be desirable to adjust the brightness responsive to the selection of scanning and non-scanning backlight mode. However the exclusive use of PWM dimming, as described above, limits the range of brightness settings available to the user in cooperation with ambient light based dimming.

It would thus be advantageous to have a color manager that is capable of operation both with PWM dimming and AM.

SUMMARY OF THE INVENTION

Accordingly, in accordance with certain of the present embodiments, a color manager is provided for use with a luminaire constituted of a plurality of different colored light emitting diode based sub-luminaires arranged to produce a combined light. The color manager comprises a sampler arranged to output an electrical representation of the optical output of the luminaire and a converter coupled to the output of said sampler and operatively associated with a current selector arranged to select the driving current level of the luminaire from a plurality of current levels. The converter is arranged to convert said electrical representation to a pre-determined calorimetric system in cooperation with one of a plurality of calibration matrixes. Each calibration matrix is selected responsive to the selected driving current level. Optionally, the calibration matrix is further selected responsive to a temperature indication associated with the luminaire. The color manager further comprises a driver operatively associated with the luminaire, the converter and the current selector. The driver is arranged to drive the luminaire in accordance with the driving current level as selected by the selector.

In certain embodiments, there is provided a method of backlighting that operates within a medium of a luminaire constituted of a plurality of colored light emitting diodes producing a combined predefined color and a driver arranged to drive the colored light emitting diodes at a plurality of driving current levels. The method comprises the stage of driving a luminaire constituted of a plurality of different colored light emitting diode based sub-luminaires at one of a selectable plurality of current levels by generating a pulse width modulated signal exhibiting a period. The method further comprises sampling the optical output of the driven luminaire, wherein the sampling is one of averaging and integrating, and wherein the sampled optical output is a function of an intensity average over the period. The method further comprises converting, responsive to the selected current level, the sampled optical output into a pre-determined calorimetric system. Optionally, the converting is further responsive to a temperature indication associated with the luminaire. Optionally, the method further comprises controlling the current driving such that the combined light produced by the luminaire is maintained substantially at a pre-determined color point.

Certain of the present embodiments thus provide for a color manager for use with a luminaire constituted of a plurality of different colored light emitting diode based sub-luminaires, the sub-luminaires arranged to produce a combined light, the color manager comprising: a sampler arranged to output an electrical representation of the optical output of the luminaire; a converter coupled to the output of the sampler and operatively associated with a current selector arranged to select the driving current level of the luminaire from a plurality of current levels, the converter arranged to convert the electrical representation to a pre-determined calorimetric system in cooperation with a calibration matrix having values selected responsive to the selected driving current level; and a driver operatively associated with the luminaire, the converter and the current selector, the driver arranged to drive the luminaire in accordance with the driving current level as selected by the current selector.

In one further embodiment the values of the calibration matrixes are further responsive to a temperature indication associated with at least one of the colored light emitting diode based sub-luminaires. In another further embodiment the electrical representation comprises a plurality of sampled light intensities, each associated with one of three colors.

In one further embodiment the calibration matrix is selected from among a plurality of calibration matrixes responsive to the selected driving current level. In another further embodiment the sampler comprises an analog to digital converter and is further arranged to receive an output of an RGB sensor.

In one further embodiment the driver exhibits a pulse width modulation signal exhibiting a period, wherein the sampler comprises one of an integrator and an averager, and wherein the electrical representation is a function of an intensity average over the period. In another further embodiment the color manager further comprises a color feedback unit arranged to control the driver such that the combined light produced by the luminaire is maintained substantially at a pre-determined color point.

In one yet further embodiment the pre-determined color point is white. In another yet further embodiment, the color manager further comprises a difference unit operatively associated with the color feedback unit and arranged to: receive externally provided target color values and the converted electrical representation in the pre-determined colorimetric system; and present the color feedback unit with the corresponding difference between the received externally provided target color values and the converted electrical representation. In another yet further embodiment the color feedback unit is arranged to generate a control signal, the driver adjusting a duty cycle of at least one of the colored light emitting diode based sub-luminaires responsive to the generated control signal. Optionally, the driver is associated with a pulse width modulation functionality exhibiting the adjustable duty cycle.

In one further embodiment the one of the plurality of driving current levels is selected responsive to an external input. In another further embodiment the one of the plurality of driving current levels is selected responsive to an ambient light sensor. In yet another further embodiment the one of the plurality of driving current levels is selected responsive to a temperature sensor.

Certain of the present embodiments thus provide for a method of backlighting comprising: driving a luminaire constituted of a plurality of different colored light emitting diode based sub-luminaires at one of a selectable plurality of current levels; sampling the optical output of the driven luminaire; and converting, responsive to the selected current level, the sampled optical output into a pre-determined calorimetric system.

In one further embodiment, the converting is further responsive to a temperature associated with the driven luminaire. In another further embodiment the sampled optical output comprises a plurality of sampled light intensities, each associated with one of three colors.

In one further embodiment the sub-luminaires each comprise a light emitting diode string. In another further embodiment the driving comprises generating a pulse width modulated signal exhibiting a period, the sampling comprises one of averaging and integrating, and wherein the sampled optical output is a function of an intensity average over the period.

In one further embodiment, the method further comprises controlling the driving such that the combined light produced by the luminaire is maintained substantially at a pre-determined color point. Optionally, the pre-determined color point is white. In one yet further embodiment, the method further comprises: receiving externally provided target color values; and outputting a signal representing a function of the difference between the received externally provided target color values and the converted sampled optical output into a pre-determined calorimetric system, wherein the controlling is responsive to the outputted signal and wherein the predetermined color point is responsive to the externally provided target color values. In another yet further embodiment the driving comprises generating a pulse width modulated signal exhibiting a duty cycle responsive to the controlling.

In one further embodiment the one of the plurality of driving current levels is selected responsive to an external input. In another further embodiment the one of the plurality of driving current levels is selected responsive to an ambient light sensor. In yet another further embodiment the one of the plurality of driving current levels is selected responsive to a temperature sensor.

Certain of the present embodiments thus provide for a color manager for use with a luminaire constituted of a plurality of different colored light emitting diode based sub-luminaires, the sub-luminaires arranged to produce a combined light, the color manager comprising: a sampler arranged to output an electrical representation of the optical output of the luminaire; a driver arranged to drive the luminaire at a selectable one of a plurality of driving current levels; and a converter coupled to the output of the sampler and operative to convert the electrical representation to a pre-determined calorimetric system in cooperation with one of a plurality of calibration matrixes, the one calibration matrix being selected responsive to the selected driving current level. Optionally, the one calibration matrix is further selected responsive to a temperature indication associated with at least one of the sub-luminaires.

Certain of the present embodiments thus provide for a backlight system comprising: a luminaire constituted of a plurality of colored light emitting diodes producing a combined white light; a sampler arranged to output an electrical representation of the optical output of the colored light emitting diodes; a driver arranged to drive the colored light emitting diodes at a selectable one of a plurality of driving current levels; and a color controller coupled to the output of the sampler and operative to convert the electrical representation to a pre-determined calorimetric system in cooperation with one of a plurality of calibration matrixes, the one calibration matrix being selected responsive to the driving current level. Optionally, the calibration matrix is further selected responsive to a temperature indication associated with the luminaire.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE INVENTION

Figure 1:
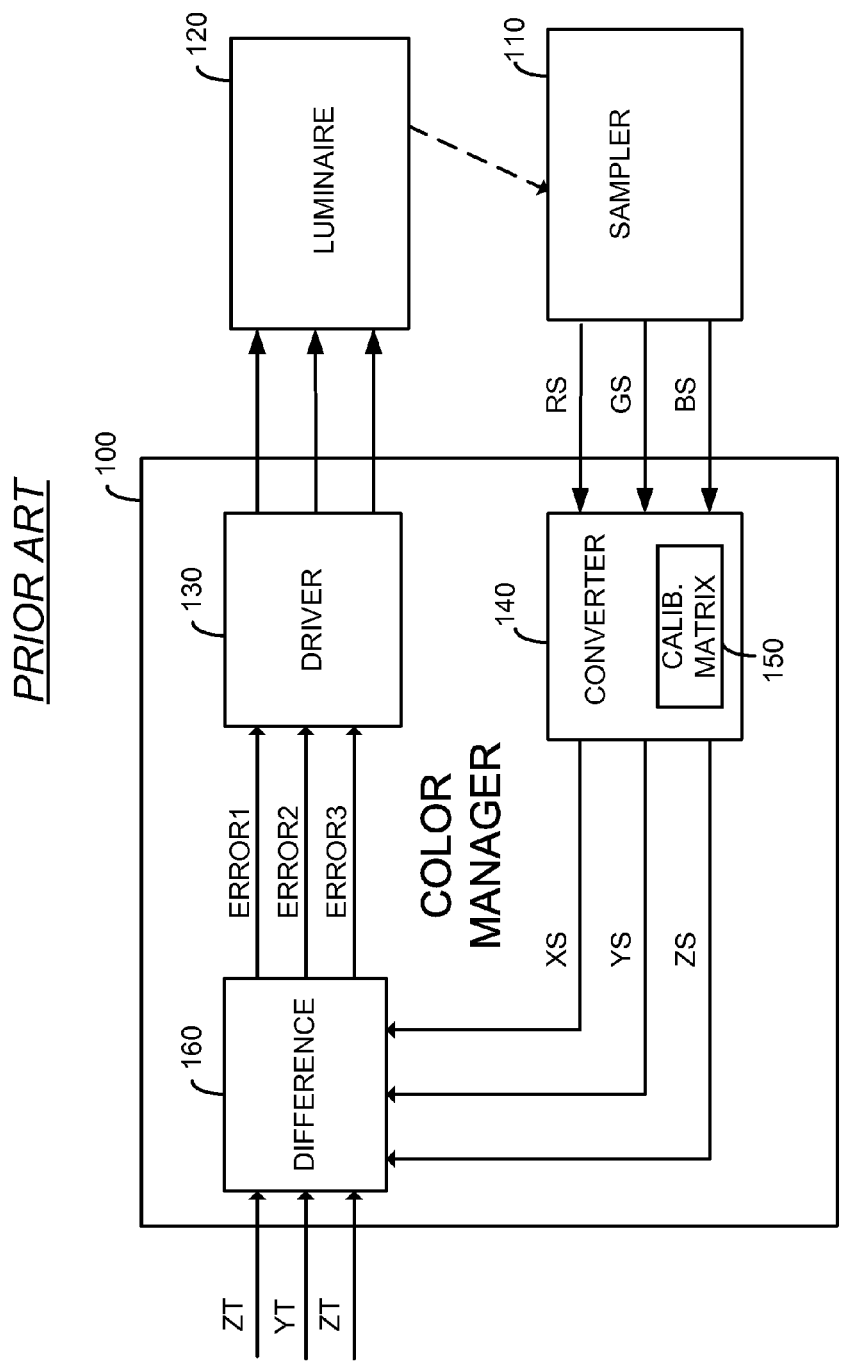
FIG. 1 is a high level block diagram of a backlighting system according to the prior art.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. In other instances, well-known methods, procedures, components and circuits have not been described in detail so as not to obscure the teachings of the present disclosure.

Figure 2:
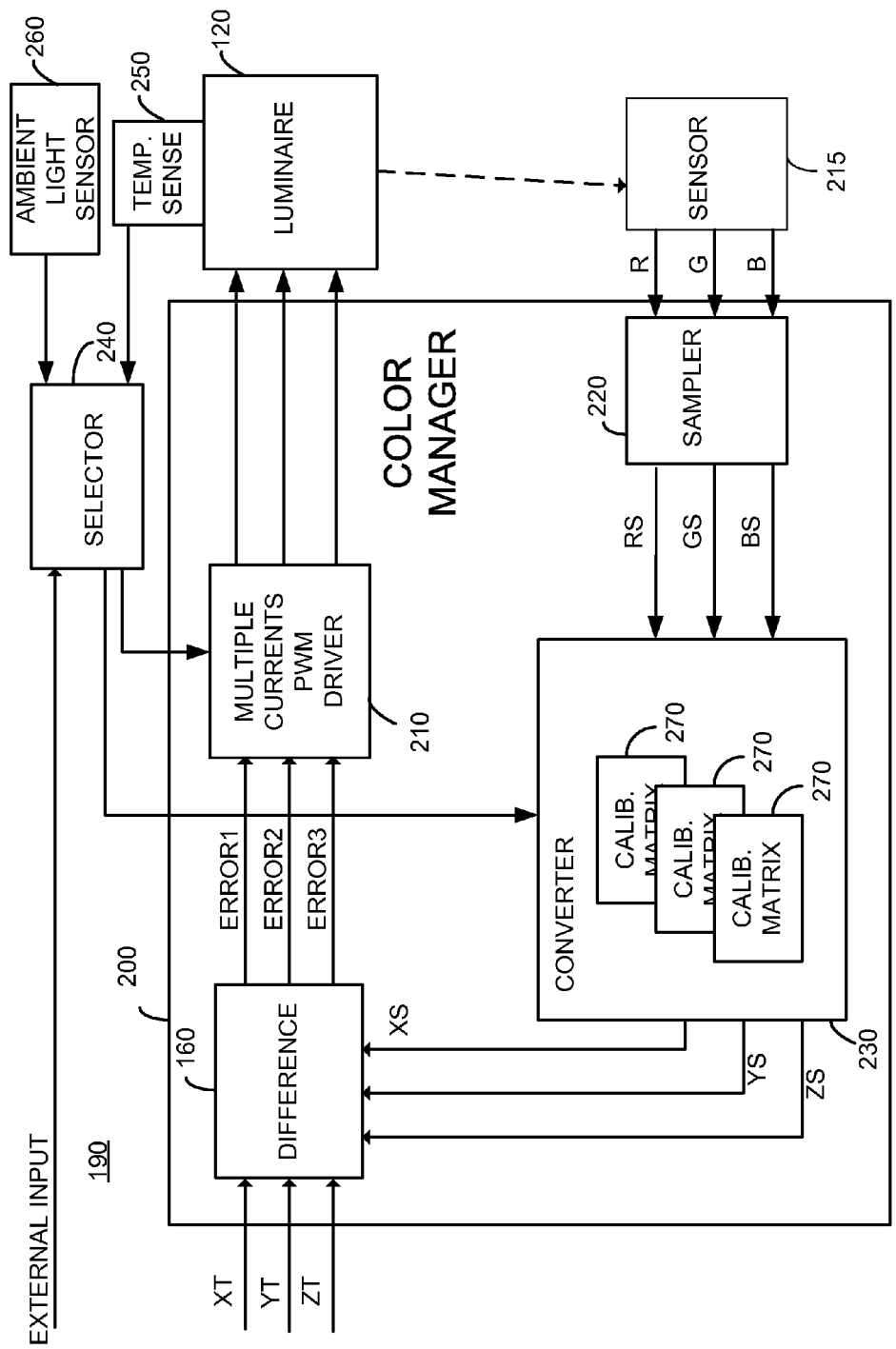
FIG. 2 is a high level block diagram of a backlighting system operative at a plurality of driving current levels according to certain embodiments.

FIG. 2 shows a high level schematic block diagram of a backlighting system 190 operative at a plurality of driving current levels according to certain embodiments comprising: a color manager 200; a luminaire 120; an RGB sensor 215; a selector 240; a temperature sensor 250; and an ambient light sensor 260. Luminaire 120 is constituted of a plurality of colored LEDs (not shown) producing a combined color. Color manager 200 comprises: a sampler 220; a converter 230 comprising a plurality of calibration matrixes 270; a difference module 160 and a PWM driver 210 operative at a plurality of current levels. Sensor 215 is in optical communication with luminaire 120 and exhibits tristimulus outputs denoted R, G and B. In one embodiment sensor 215 is constituted of an RGB photodiode. Sampler 220 is coupled to sensor 215 and is arranged to receive outputs R, G and B and output a sampled representation thereof denoted, RS, GS and BS, respectively. Converter 230 is coupled to sampler 220 and is arranged to receive tristimulus outputs RS, GS and BS and output tristimulus outputs denoted XS, YS and ZS. Difference module 160 is coupled to converter 230 and is arranged to receive tristimulus outputs XS, YS and ZS and external signals, denoted XT, YT and ZT, corresponding to the desired output color point and intensity of luminaire 120. Difference module 160 is further arranged to output a plurality of error signals responsive to the difference between the respective input signals and denoted ERROR1, ERROR2 and ERROR3. PWM driver 210 is arranged to receive the plurality of error signals ERROR1, ERROR2 and ERROR3 and output a plurality of driving signals coupled to luminaire 120. Selector 240 is coupled to the output of ambient light sensor 260, the output of temperature sensor 250 and an optional external input. Temperature sensor 250 is arranged to sense the temperature of luminaire 120. One output of selector 240 is coupled to a respective input of PWM driver 210 and a second output of selector 240 is coupled to a respective input of converter 230.

In operation selector 240 is operative to select a current level for driving the LEDs in luminaire 120 responsive to one or more of the temperature of luminaire 120 as sensed by temperature sensor 250, the ambient light as sensed by ambient light sensor 260 or an externally generated input. Selector 240 delivers a selection signal to driver 210 and to converter 230.

Sensor 215 is arranged to receive a portion of the optical output of luminaire 120, and output an electrical representation thereof. Sampler 220 is operative to sample the output of sensor 215, thus outputting a sampled electrical representation of the optical output of the colored light emitting diodes of luminaire 120. Converter 230 is operative to receive the sampled representation of the optical output of luminaire 120 and convert it to tristimulus calorimetric values set over the same color space as the target tristimulus calorimetric values XT, YT and ZT responsive to the selected current level, and optionally to the temperature indication output by temperature sensor 250, as indicated by selector 240. In further detail, converter 230 selects a particular one of the plurality of calibration matrixes 270 responsive to an output of selector 240. Selector 240 selects the appropriate calibration matrix from the plurality of calibration matrixes 270 responsive to the selected current level for driving the LEDs in luminaire 120 and optionally responsive to the temperature indication of temperature sensor 250. Converter 230, in cooperation with the selected calibration matrix 270 converts received RS, GS and BS to XS, YS and ZS which are consonant with the color space of received target values XT, YT and ZT. The above has been described in an embodiment in which the received target values are expressed in X,Y,Z space, however this is not meant to be limiting in any way. Other color coordinate systems may be utilized, including, without limitation, CIE LAB, Adobe RGB, sRGB, CIE LUV, CIE UVW, and CIE xyY, without exceeding the scope of the invention.

Difference unit 160 is operative to compare the converted sampled representation of the optical output of luminaire 120 XS, YS and ZS with the target values XT, YT and ZT and output error signals ERROR1, ERROR2 and ERROR3 responsive to the difference there between. PWM driver 210 is operative to adjust one or more of the duty rate and current level responsive to error signals ERROR1, ERROR2 and ERROR3 so as to converge the output of luminaire 120 with target signals XT, YT and ZT. Specifically, in one embodiment driver 120 is arranged to generate driving signals having a current level as selected by selector 240 and a duty rate responsive to ERROR1, ERROR2 and ERROR3.

The above has been described in an embodiment where a plurality of calibration matrixes 270 is supplied, however this is not meant to be limiting in any way. In another embodiment a single calibration matrix 270 is supplied having values determined responsive to the selected current level, and optionally to the temperature indication output by temperature sensor 250, as indicated by selector 240. There is further no requirement that the plurality of current levels be in discrete steps, and a continuously variable current level is specifically included.

Figure 3:
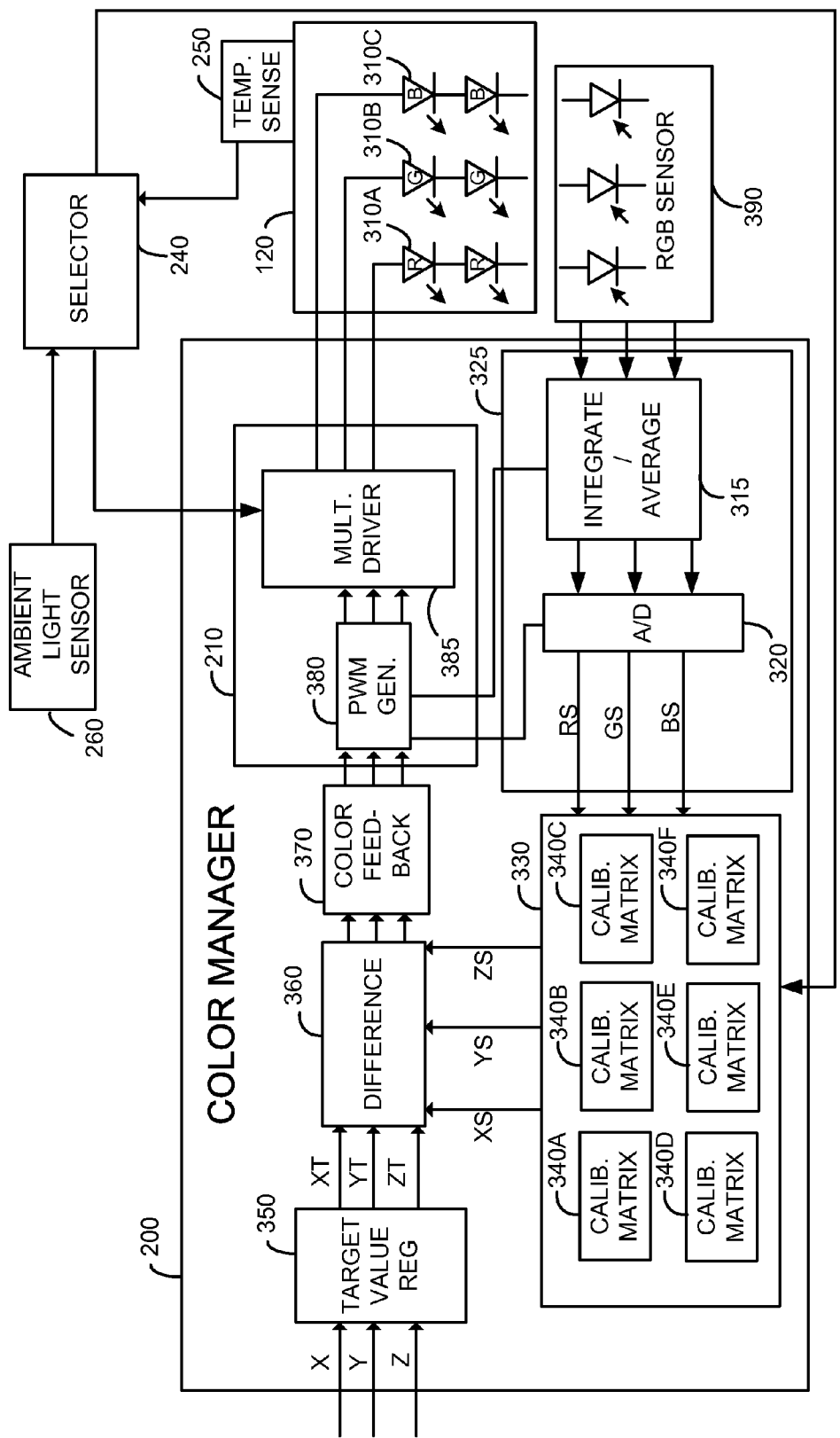
FIG. 3 is a more detailed block diagram of an embodiment of the backlighting system of FIG. 2 according to certain embodiments.

FIG. 3 shows a more detailed block diagram of an embodiment of backlighting system 190 of FIG. 2 according to certain embodiments of the present invention. Color manager 200 is operative at a plurality of driving current levels, for use with a luminaire 120 constituted of a plurality of colored LED strings, 310A, 310B and 310C emitting red, green and blue light respectively. LED strings 310A, 310B and 310C are arranged to produce a combined color when mixed, the color being responsive to received target values, denoted X, Y, Z.

Color manager 200 comprises a sampler 325 having tristimulus inputs and outputs, a converter 330 having tristimulus inputs and outputs, a target value register 350 having tristimulus inputs and outputs, a difference module 360 having two sets of tristimulus inputs and one set of outputs, a color feedback unit 370 having inputs and outputs, and a driver 210 having inputs and outputs. The tristimulus input of sampler 325 are coupled to tristimulus outputs of an RGB sensor 390. The tristimulus outputs of sampler 325 are connected to the tristimulus inputs of converter 330. The tristimulus outputs of converter 330 are connected to a first set of the tristimulus inputs of difference module 360. The inputs of target value register 350, denoted X,Y,Z are fed by a video processor or a controller (not shown). The tristimulus outputs of target value register 350 are connected to a second set of tristimulus inputs of difference module 360. The outputs of difference module 360 are connected to the inputs of color feedback unit 370. The outputs of color feedback unit 370 are connected to the inputs of driver 210. The outputs of driver 210 are connected to colored LED strings 310A, 310B and 310C, constituting luminaire 120. A portion of the optical output of luminaire 120 is received by RGB sensor 390.

Color manager 200 is operatively associated with selector 240 having inputs and outputs. One input of selector 240 is coupled to an output of an ambient light sensor 260 and another input of selector 240 is coupled to an output of a temperature sensor 250. Temperature sensor 250 is arranged to sense a temperature associated with one or more of colored LED strings 310A, 310B and 310C and output an indication of the temperature associated with at least one of the colored LED strings 310A, 310B and 310C.

According to certain embodiments, sampler 325 comprises an integrator or an averager 315 having tristimulus inputs and outputs and an analog to digital converter (A/D) 320 having tristimulus inputs and outputs. The inputs of integrator or averager 315 are connected to the outputs of RGB sensor 390. The outputs of integrator or averager 315 are connected to the inputs of A/D 320. The outputs of A/D 320 are connected to the inputs of converter 330. In addition, a PWM generator 380 is connected both to A/D 320 and integrator or averager 315.

According to certain embodiments, converter 330 comprises a plurality of selectable calibration matrixes 340A-340F. Driver 210 comprises PWM generator 380 having inputs and outputs and a multiple currents LED driver 385, having inputs and outputs. The outputs of color feedback unit 370 are coupled to the inputs of PWM generator 380. Further, the outputs of PWM generator 380 are coupled to the inputs of multiple currents LED driver 385. One output of selector 240 is connected to a control input of multiple currents LED driver 385 and another output of selector 240 is coupled to converter 330.

In operation, selector 240 is arranged to select the current level for driving the colored LED strings, 310A, 310B and 310C responsive to one or more of the temperature of luminaire 120 as sensed by temperature sensor 250, the ambient light as sensed by ambient light sensor 260 and an external signal. Selector 240 delivers a selection signal to multiple currents LED driver 385. Selector 240 further delivers a selection signal to converter 330 responsive to the selection signal delivered to multiple currents LED driver 385, and optionally further responsive to a temperature indication received from temperature sensor 250.

Target value register 350 is arranged to receive target tristimulus colorimetric signals X, Y, Z from an external source such as a video processor or a controller (not shown). Target value register 350 stores the digitized target tristimulus values and outputs latched values denoted XT, YT, ZT which are set over a predefined color space.

RGB sensor 390 is arranged to convert a portion of the optical output of luminaire 120 to an electrical representation. Sampler 325 is arranged to output a tristimulus sampled electrical representation of the optical output of the colored LED strings, 310A, 310B and 310C. These samples, denoted as RS, GS, BS are not necessarily set over the same color space as XT, YT, ZT.

According to certain embodiments, sampler 325 receives signals from RGB sensor 390 and integrates or averages the received signal over a period of PWM generator 380, or over a frame, using integrator or averager 315. The integrated or averaged signal is then digitized by A/D converter 320 and output as sampled tristimulus values RS, GS, BS corresponding to the combined light output of colored LED strings 310A, 310B and 310C. The sampled tristimulus values RS, GS, BS are fed into converter 330 which is arranged to convert them, by selecting a particular one of selectable calibration matrixes 340A-340F corresponding to the selected current level, and optionally responsive to the temperature indication output by temperature sensor 250, as selected by selector 240, into tristimulus calorimetric values XS, YS, ZS set over a color space consonant with the color space of target tristimulus colorimetric values X, Y, Z. According to certain embodiments, calibration matrixes 340A-340F are set during production of color manager 200 and are chosen such that each calibration matrix of calibration matrixes 340A-340F corresponds with a tristimulus calorimetric values conversion associated with a predefined current level. In another embodiment, a plurality of calibration matrixes 340A-340F are provided for certain current levels, with the particular calibration matrix selected responsive to the temperature indication output by temperature sensor 250.

Both sampled calorimetric tristimulus values XS, YS, ZS and target latched calorimetric tristimulus values XT, YT, ZT are fed into difference module 360 which is operative to subtract the target values XT, YT, ZT from the sampled values XS, YS, ZS. Difference module 360 then feeds color feedback unit 370 with the difference between the target and the sampled tristimulus values. Color feedback unit 370 is arranged to control PWM generator 380 such that PWM generator 380 generates PWM signals responsive to the difference between the target and the sampled tristimulus values. Specifically, the PWM signals output by PWM generator 380 exhibit a duty cycle and a period wherein the duty cycle is selected responsive to the difference between the target and the sampled tristimulus values thus converging the output of colored LED strings 310A-310C to the values of XT, YT, ZT.

Multiple currents LED driver 385 is arranged to receive the PWM signals output by PWM generator 380 and generate in turn PWM driving signals at the selected current level responsive to the output of selector 240.

The above has been described in an embodiment where a plurality of calibration matrixes 340A-340F is supplied, however this is not meant to be limiting in any way. In another embodiment a single calibration matrix is supplied having values determined responsive to the selected current level, and optionally to the temperature indication output by temperature sensor 250, as indicated by selector 240. There is further no requirement that the plurality of current levels be in discrete steps, and a continuously variable current level is specifically included.

Figure 4:
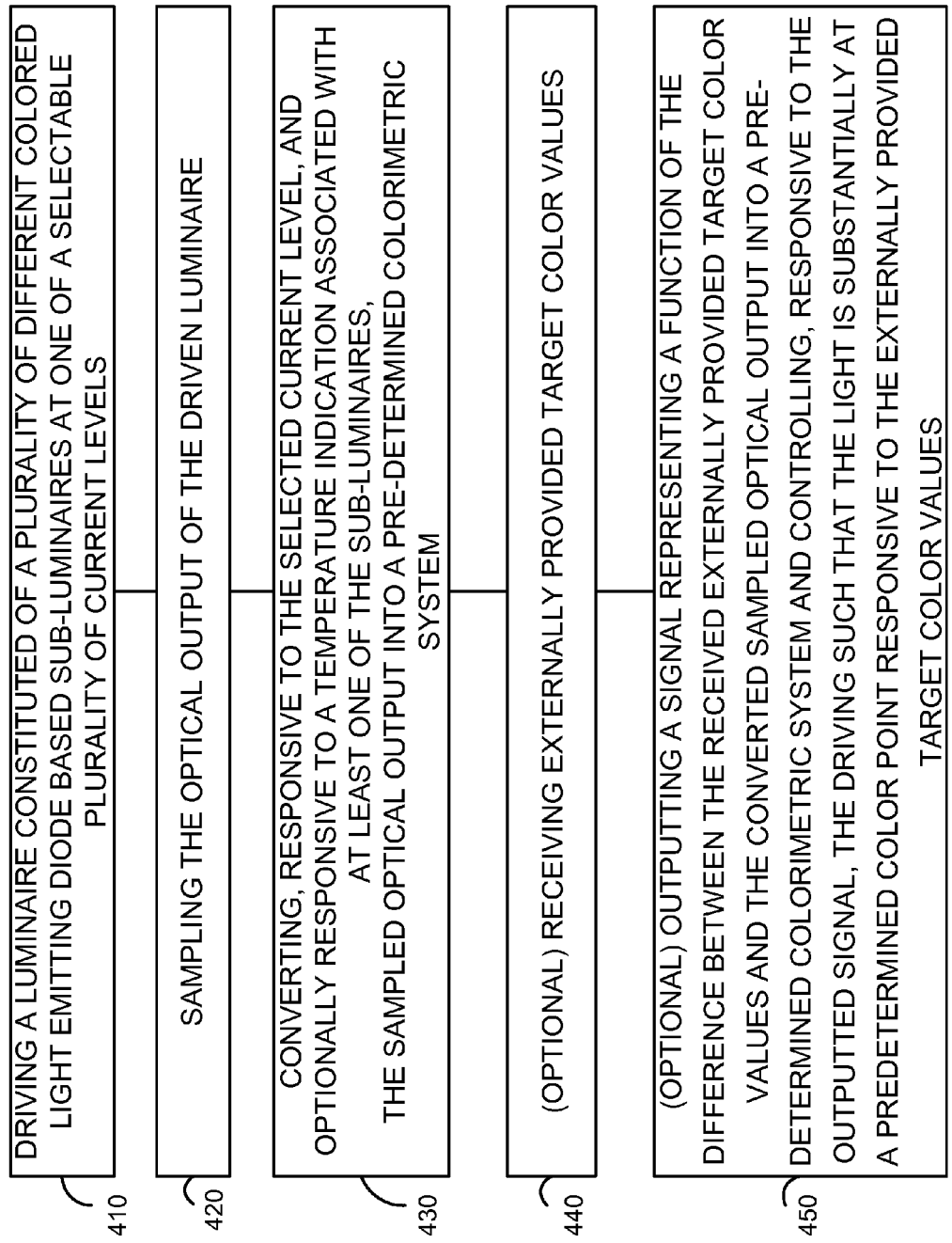
FIG. 4 is a high level flow chart of a first method according to certain embodiments.

FIG. 4 is a high level flow chart of a first method of backlighting according to certain embodiments. The method operates within a medium of a luminaire constituted of a plurality of colored light emitting diodes producing a combined predefined color light and a driver arranged to drive the colored light emitting diodes at a plurality of driving current levels. In stage 410 the method comprises driving a luminaire constituted of a plurality of different colored light emitting diode based sub-luminaires at one of a selectable plurality of current levels. In stage 420 the optical output of the driven luminaire is sampled. In stage 430 the sampled optical output is converted, responsive to the selected current level, and optionally responsive to a temperature indication associated with at least one of the sub-luminaires of stage 410, into a pre-determined calorimetric system.

Optionally, in stage 440 the method further comprises receiving externally provided target color values. Further optionally, in stage 450 the method comprises outputting a signal representing a function of the difference between the received externally provided target color values of optional stage 440 and the converted sampled optical output of stage 430 and controlling the driving of stage 410 responsive to the output signal so that the light output by the luminaire is substantially at a predetermined color point responsive to the received values of stage 440.

Figure 5:
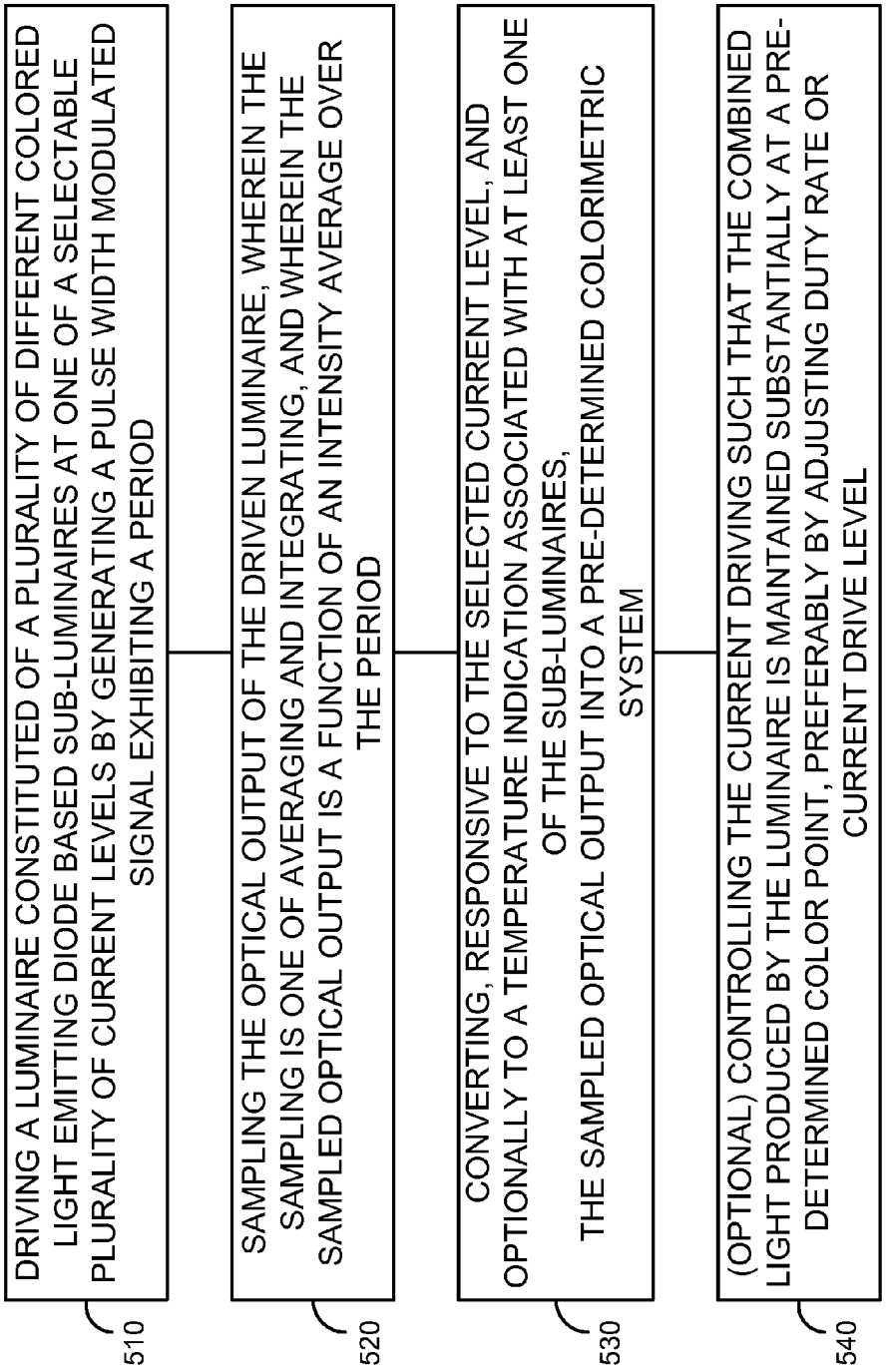
FIG. 5 is a high level flow chart of a second method according to certain embodiments.

FIG. 5 is a high level flow chart of a second method of backlighting according to certain embodiments. The method operates within a medium of a luminaire constituted of a plurality of colored light emitting diodes producing a combined predefined color and a driver arranged to drive the colored light emitting diodes at a plurality of driving current levels. In stage 510, a luminaire constituted of a plurality of different colored light emitting diode based sub-luminaires is driven at one of a selectable plurality of current levels by generating a pulse width modulated signal exhibiting a period. In stage 520 the optical output of the driven luminaire is sampled, wherein the sampling is one of averaging and integrating, and wherein the sampled optical output is a function of an intensity average over the period. In stage 530 the sampled optical output of stage 520 is converted, responsive to the selected current level, and optionally responsive to a temperature indication associated with at least one of the sub-luminaires of stage 510, into a pre-determined calorimetric system. Optionally, in stage 540, the driving of stage 510 is controlled, by adjusting one of the duty rate and the current drive, such that the combined light produced by the luminaire is maintained substantially at a pre-determined color point.

Figure 6:
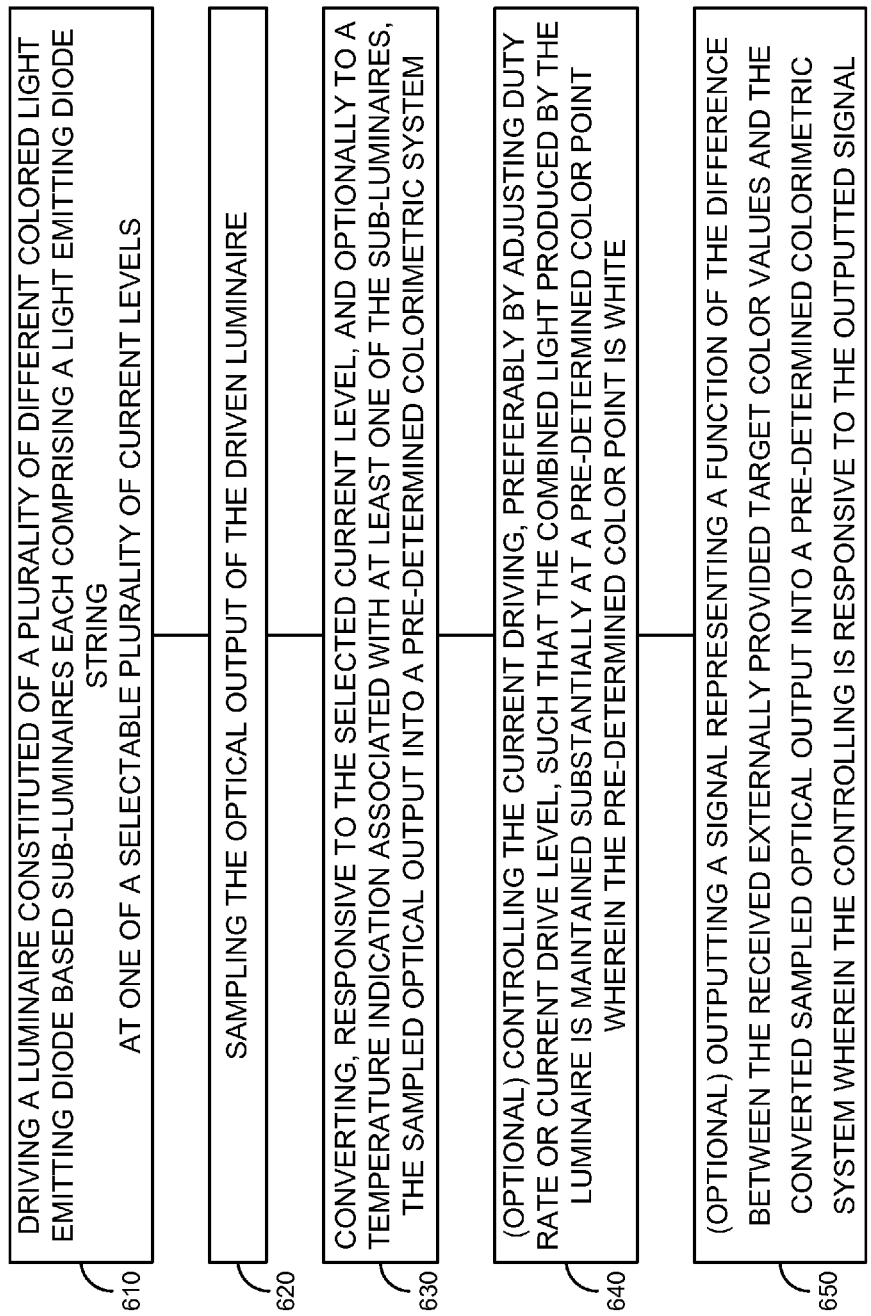
FIG. 6 is a high level flow chart of a third method according to certain embodiments.

FIG. 6 is a high level flow chart of a third method of backlighting according to certain embodiments. The method operates within a medium of a luminaire constituted of a plurality of colored light emitting diodes producing a combined predefined color and a driver arranged to drive the colored light emitting diodes at a plurality of driving current levels. In stage 610 a luminaire constituted of a plurality of different colored light emitting diode based sub-luminaires each comprising a light emitting diode string is driven at one of a selectable plurality of current levels. In stage 620 the optical output of the driven luminaire of stage 610 is sampled. In stage 630 the sampled output of stage 620 is converted, responsive to the selected current level of stage 610, and optionally responsive to a temperature indication associated with at least one of the sub-luminaires of stage 610, into a pre-determined calorimetric system. In optional stage 640 the driving of stage 610 is controlled, by adjusting one of the duty rate and the current drive, such that the combined light produced by the luminaire is maintained substantially at a pre-determined color point wherein the pre-determined color point is optionally white. In optional stage 650 a signal is output representing a function of the difference between received externally provided target color values and the converted sampled optical output of stage 630 wherein the controlling of optional stage 640 is responsive to the outputted signal.

Figure 7:
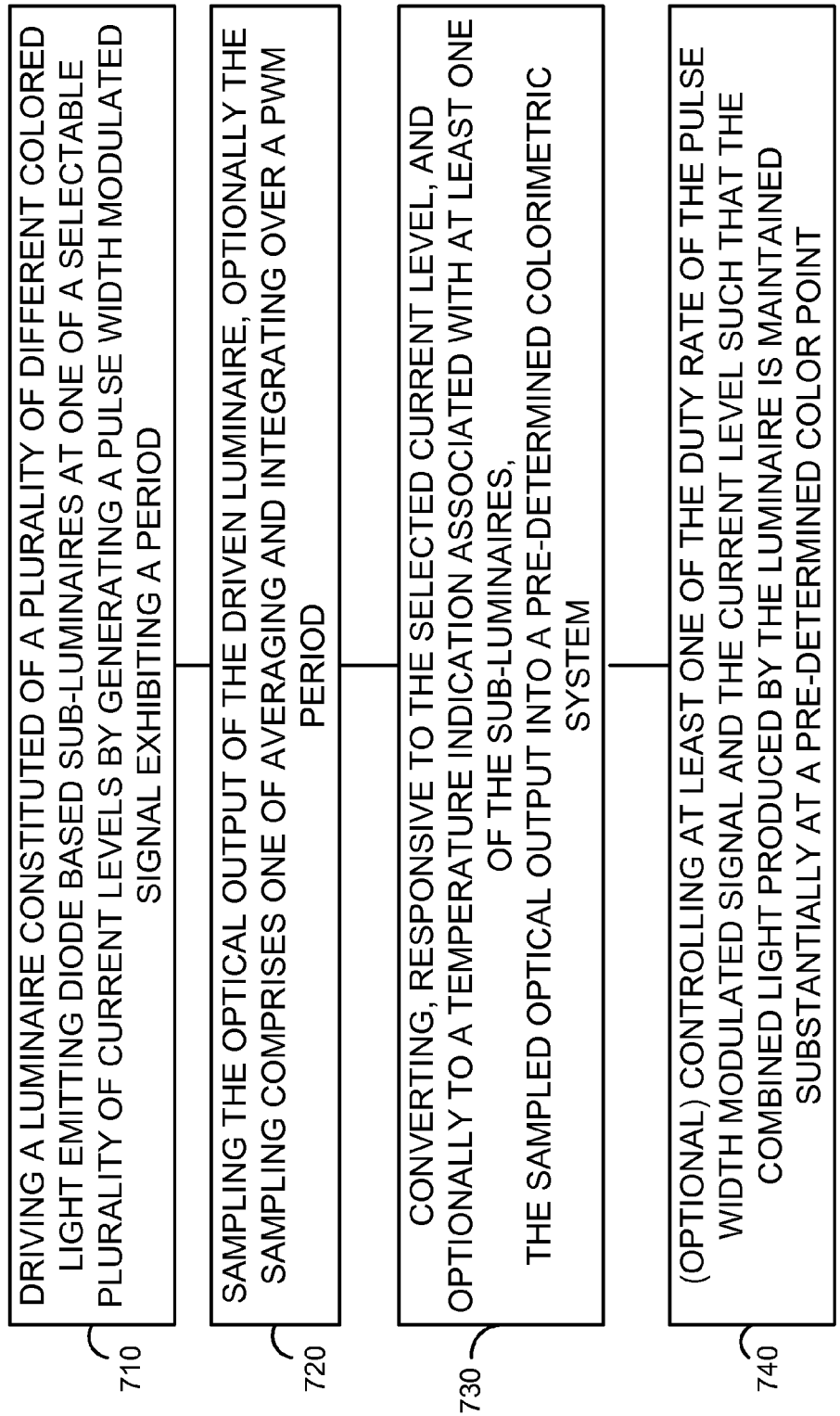
FIG. 7 is a high level flow chart of a fourth method according to certain embodiments.

FIG. 7 is a high level flow chart of a fourth method of backlighting according to certain embodiments. The method operates within a medium of a luminaire constituted of a plurality of colored light emitting diodes producing a combined predefined color and a driver arranged to drive the colored light emitting diodes at a plurality of driving current levels. In stage 710 a luminaire constituted of a plurality of different colored light emitting diode based sub-luminaires is driven at one of a selectable plurality of current levels by generating a pulse width modulated signal exhibiting a period. In stage 720 the optical output of the luminaire driven in stage 710 is sampled, optionally by one of averaging and integrating over a PWM period. In stage 730 the sampled optical output of stage 720 is converted, responsive to the selected current level of stage 710 and optionally responsive to a temperature indication associated with at least one of the sub-luminaires of stage 710, to a pre-determined calorimetric system. In optional stage 740 the driving current of stage 710 is controlled, preferably by controlling at least one of the duty rate of the pulse width modulated signal and the current level, such that the combined light produced by the luminaire is maintained substantially at a pre-determined color point.

Figure 8:
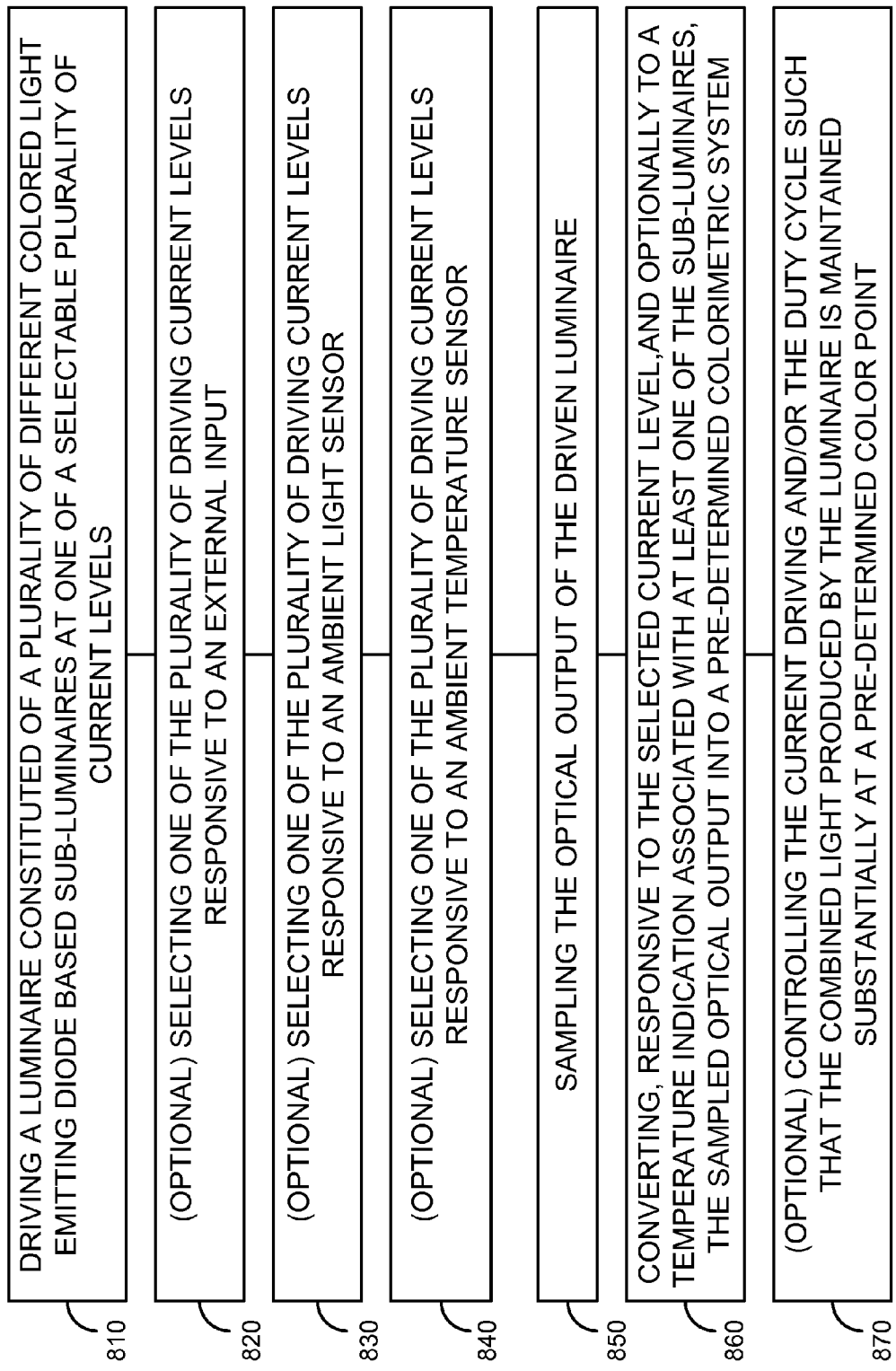
FIG. 8 is a high level flow chart of a fifth method according to certain embodiments.

FIG. 8 is a high level flow chart of a fifth method of backlighting according to certain embodiments. The method operates within a medium of a luminaire constituted of a plurality of colored light emitting diodes producing a combined predefined color light and a driver arranged to drive the colored light emitting diodes at a plurality of driving current levels. In stage 810 a luminaire constituted of a plurality of different colored light emitting diode based sub-luminaires is driven at one of a selectable plurality of current levels. Optionally in stage 820 the driving current level is selected responsive to an external input. Optionally in stage 830 the driving current level is selected responsive to an ambient light sensor. Optionally in stage 840 the driving current level is selected responsive to an ambient temperature sensor. In stage 850 the optical output of the driven luminaire of stage 810 is sampled. In stage 860 the sampled optical output of stage 850 is converted, responsive to the selected current level of stages 810-840, and optionally responsive to a temperature indication associated with at least one of the sub-luminaires of stage 810, into a pre-determined calorimetric system. In optional stage 870 the driving of stage 810 is controlled, by adjusting at least one of the duty rate and the current drive, such that the combined light produced by the luminaire is maintained substantially at a pre-determined color point.

Thus, in accordance with certain embodiments, a color manager is enabled for use with a luminaire constituted of a plurality of different colored light emitting diode based sub-luminaires arranged to produce a combined light. The color manager comprises a sampler arranged to output an electrical representation of the optical output of the luminaire, a converter coupled to the output of said sampler and operatively associated with a current selector arranged to select the driving current level of the luminaire from a plurality of current levels. The converter is arranged to convert said electrical representation to a pre-determined calorimetric system in cooperation with one of a plurality of calibration matrixes. Each calibration matrix is selected responsive to the selected driving current level, and optionally further selected responsive to a temperature indication associated with the luminaire. The color manager further comprises a driver operatively associated with the luminaire, the converter and the current selector. The driver is arranged to drive the luminaire in accordance with the driving current level as selected by the selector.

In certain embodiments, there is provided a method of backlighting that operates within a medium of a luminaire constituted of a plurality of colored light emitting diodes producing a combined predefined color and a driver arranged to drive the colored light emitting diodes at a plurality of driving current levels. The method comprises the stage of driving a luminaire constituted of a plurality of different colored light emitting diode based sub-luminaires at one of a selectable plurality of current levels by generating a pulse width modulated signal exhibiting a period. The method further comprises sampling the optical output of the driven luminaire, wherein the sampling is one of averaging and integrating, and wherein the sampled optical output is a function of an intensity average over the period. The method further comprises converting, responsive to the selected current level, and optionally further selected responsive to a temperature indication associated with at least one of the sub-luminaires, the sampled optical output into a pre-determined calorimetric system. Optionally, the method further comprises controlling the current driving such that the combined light produced by the luminaire is maintained substantially at a pre-determined color point.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of certain embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Those skilled in the art will envision other possible variations, modifications, and applications that are also within the scope of the invention. Accordingly, the scope of the invention should not be limited by what has thus far been described, but by the appended claims and their legal equivalents.

What is claimed is:

1. A color manager for use with a luminaire constituted of a plurality of different colored light emitting diode based sub-luminaires, the sub-luminaires arranged to produce a combined light, the color manager comprising:

a sampler arranged to output an electrical representation of the optical output of the luminaire;

a converter coupled to the output of said sampler and operatively associated with a current selector, the current selector arranged to select the driving current level of the luminaire from a plurality of selectable current levels, said converter comprising a plurality of calibration matrixes each associated with a particular one of the selectable driving current levels, said converter arranged to select the calibration matrix associated with the selected driving current level and to convert said electrical representation to a pre-determined colorimetric system in cooperation with said selected calibration matrix; and a driver operatively associated with the luminaire, the converter and the current selector, said driver arranged to drive the luminaire in accordance with the driving current level as selected by the current selector.

2. A color manager according to claim 1, wherein each of said calibration matrixes exhibit values responsive to a temperature indication associated with at least one of the colored light emitting diode based sub-luminaires.

3. A color manager according to claim 1, wherein the electrical representation comprises a plurality of sampled light intensities, each associated with one of three colors.

4. A color manager according to claim 1, wherein said sampler comprises an analog to digital converter and is further arranged to receive an output of an RGB sensor.

5. A color manager according to claim 1, wherein said driver exhibits a pulse width modulation signal exhibiting a period, wherein said sampler comprises one of an integrator and an averager, and wherein said electrical representation is a function of an intensity average over said period.

6. A color manager according to claim 1, further comprising a color feedback unit arranged to control the driver such that the combined light produced by the luminaire is maintained substantially at a pre-determined color point.

7. A color manager according to claim 6, wherein said pre-determined color point is white.

8. A color manager according to claim 6, further comprising a difference unit operatively associated with the color feedback unit and arranged to:
receive externally provided target color values and said converted electrical representation in said pre-determined colorimetric system; and
present the color feedback unit with the corresponding difference between the received externally provided target color values and the converted electrical representation.

9. A color manager according to claim 6, wherein said color feedback unit is arranged to generate a control signal, said driver adjusting a duty cycle of at least one of the colored light emitting diode based sub-luminaires responsive to said generated control signal.

10. A color manager according to claim 9, wherein said driver is associated with a pulse width modulation functionality exhibiting said adjustable duty cycle.

11. A color manager according to claim 1, wherein the current selector is arranged to select the driving current level responsive to an external input.

12. A color manager according to claim 1, wherein the current selector is arranged to select the driving current level responsive to an ambient light sensor.

13. A color manager according to claim 1, wherein the current selector is arranged to select the driving current level responsive to a temperature sensor.

14. A method of backlighting comprising:
driving a luminaire constituted of a plurality of different colored light emitting diode based sub-luminaires at a selected one of a selectable plurality of current levels;
providing a converter comprising a plurality of calibration matrixes, each of the calibration matrixes associated with a particular one of the plurality of current levels;
sampling the optical output of the driven luminaire;
selecting the calibration matrix of the plurality of calibration matrixes associated with said selected current level; and
converting, responsive to said selected calibration matrix, said sampled optical output into a pre-determined colorimetric system.

15. A method according to claim 14, wherein said converting is further responsive to a temperature associated with the driven luminaire.

16. A method according to claim 14, wherein said sampled optical output comprises a plurality of sampled light intensities, each associated with one of three colors.

17. A method according to claim 14, wherein the sub-luminaires each comprise a light emitting diode string.

18. A method according to claim 14, wherein said driving comprises generating a pulse width modulated signal exhibiting a period, said sampling comprises one of averaging and integrating, and wherein said sampled optical output is a function of an intensity average over said period.

19. A method according to claim 14, further comprising controlling said driving such that the combined light produced by the luminaire is maintained substantially at a pre-determined color point.

20. A method according to claim 19, wherein said pre-determined color point is white.

21. A method according to claim 19, further comprising:
receiving externally provided target color values; and
outputting a signal representing a function of the difference between said received externally provided target color values and said converted sampled optical output into a pre-determined colorimetric system,
wherein said controlling is responsive to said outputted signal and wherein said predetermined color point is responsive to said externally provided target color values.

22. A method according to claim 19, wherein said driving comprises generating a pulse width modulated signal exhibiting a duty cycle responsive to said controlling.

23. A method according to claim 14, wherein said one of the plurality of driving current levels is selected responsive to an external input.

24. A method according to claim 14, wherein said one of the plurality of driving current levels is selected responsive to an ambient light sensor.

25. A method according to claim 14, wherein said one of the plurality of driving current levels is selected responsive to a temperature sensor.

26. A color manager for use with a luminaire constituted of a plurality of different colored light emitting diode based sub-luminaires, the sub-luminaires arranged to produce a combined light responsive to a selector, the selector arranged to select a drive current level for the light emitting diodes of the luminaire from a plurality of selectable driving current levels, the color manager comprising:
a sampler arranged to output an electrical representation of the optical output of the luminaire;
a driver arranged to drive the luminaire at the selected one of the plurality of driving current levels; and a converter comprising a plurality of calibration matrixes, each of said plurality of calibration matrixes associated with a particular one of the plurality of selectable driving current levels, said converter coupled to the output of said sampler, in communication with the selector, arranged to select the calibration matrix associated with the selected driving current level, and arranged to convert said electrical representation to a pre-determined colorimetric system in cooperation with said selected calibration matrix.

27. A color manager according to claim 26, wherein said calibration matrix is further selected responsive to a temperature indication associated with at least one of the sub-luminaires.

28. A backlight system comprising:
   a luminaire constituted of a plurality of colored light emitting diodes producing a combined white light;
   a sampler arranged to output an electrical representation of the optical output of the colored light emitting diodes;
   a driver arranged to drive the colored light emitting diodes at a selectable one of a plurality of driving current levels; and
   a color controller, comprising a plurality of calibration matrixes, each of the plurality of calibration matrixes associated with a particular one of the plurality of driving current levels, said color controller coupled to the output of said sampler and arranged to select the calibration matrix associated with the selected one of the plurality of driving current levels, said color controller further arranged to convert said electrical representation to a pre-determined colorimetric system in cooperation with said selected calibration matrix.

29. A backlight system according to claim 28, wherein said calibration matrix is further selected responsive to a temperature indication associated with said luminaire.

* * * * *